Nov. 29, 1960  C. H. GERBER  2,962,673
AMPLITUDE MODULATION METER
Filed June 20, 1958  2 Sheets-Sheet 1
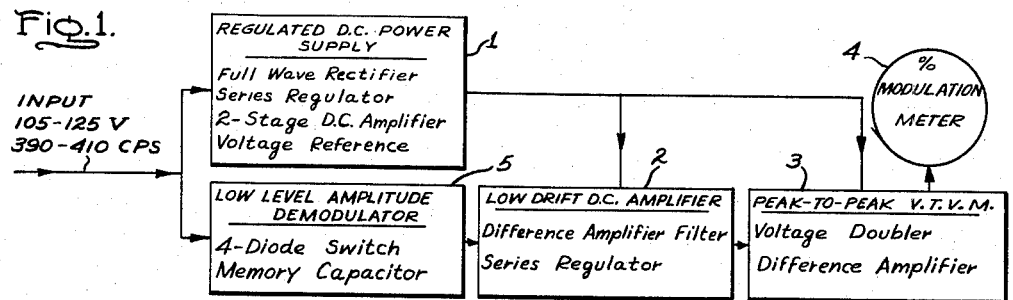
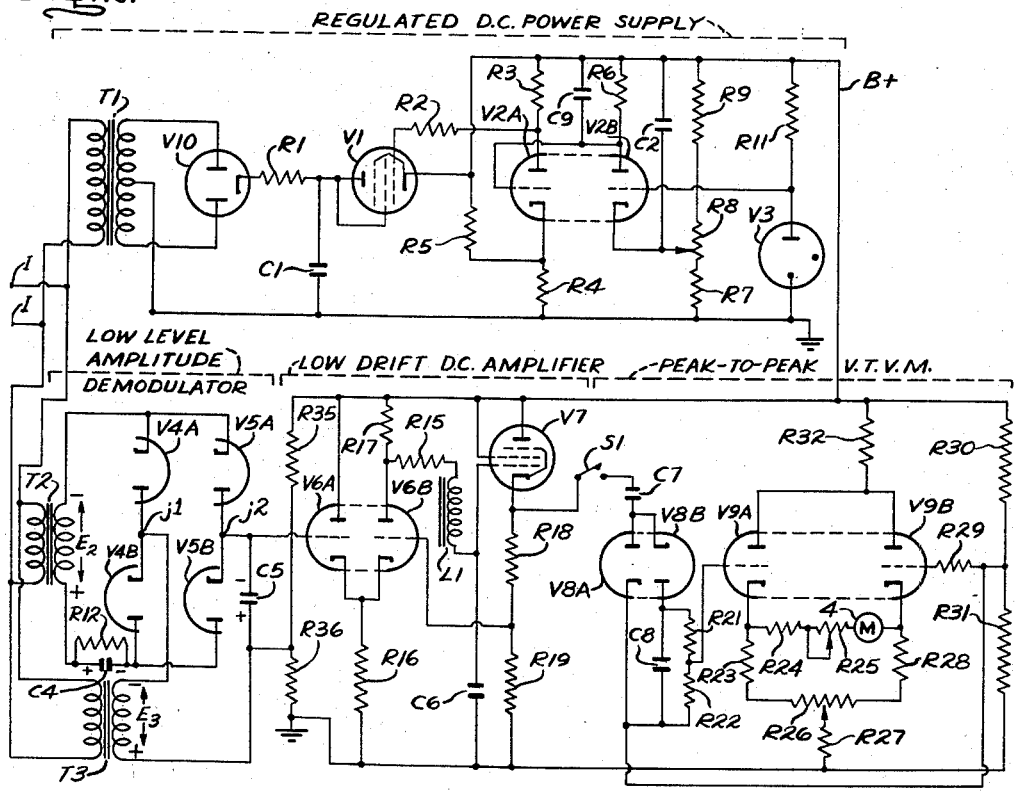
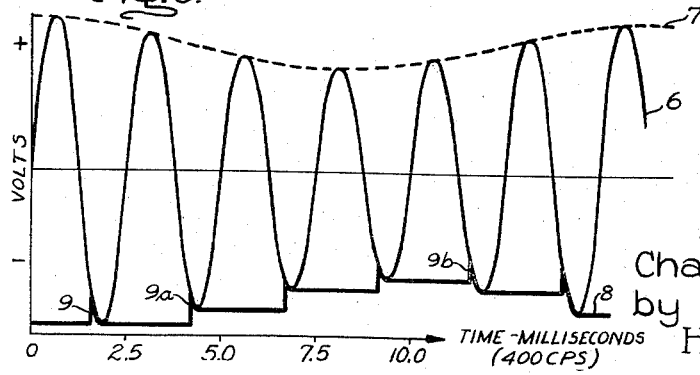
Inventor:
Charles H. Gerber,
by
His Attorney.

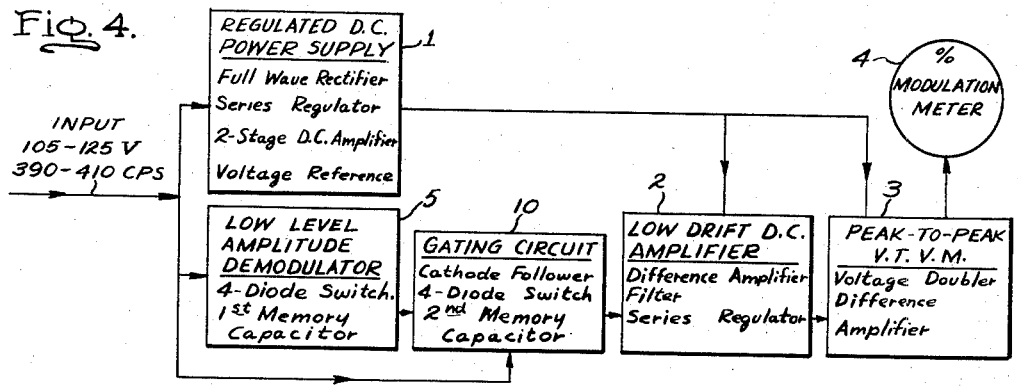
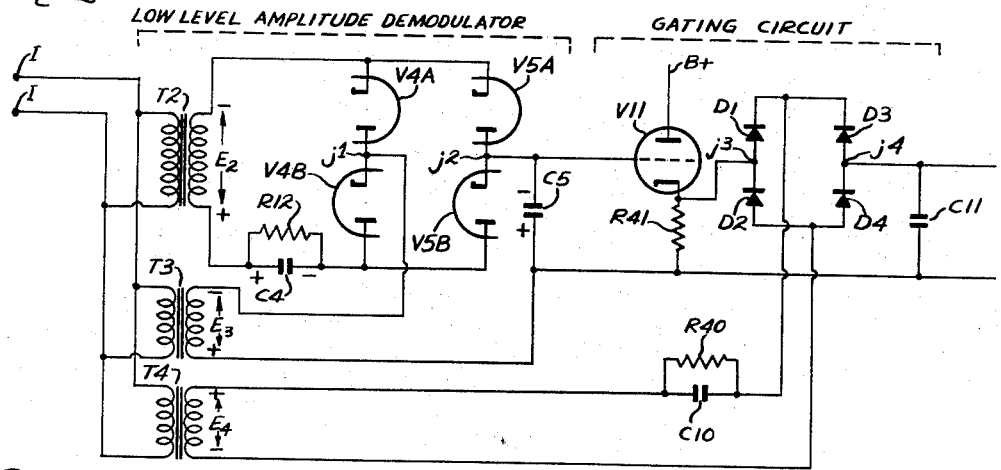
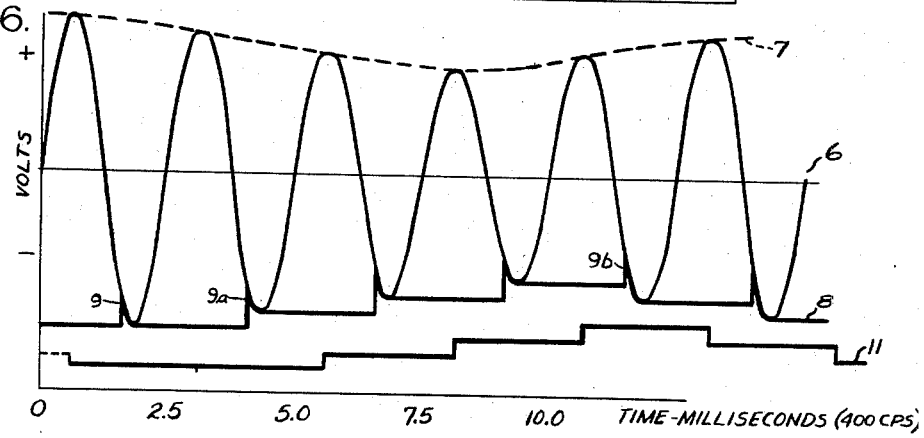

United States Patent Office 2,962,673
Patented Nov. 29, 1960

2,962,673

AMPLITUDE MODULATION METER

Charles H. Gerber, Cleveland, Ohio, assignor to Avtron Manufacturing, Inc., a corporation of Ohio Filed June 20, 1958, Ser. No. 743,357

12 Claims. (Cl. 332—39)

This invention relates in general to the measurement of electric wave modulation and more particularly to a meter or test set for measuring the voltage level of the amplitude modulation of an alternating voltage in order to determine its percentage modulation.

In certain applications of high frequency electrical power systems, it is necessary to be able to determine accurately low-level amplitude modulations of an alternator output occurring at a comparatively high frequency relative to the alternator frequency. For instance, in a 400 cycle per second aircraft electrical system, it may be necessary to measure amplitude modulations no greater than 2% resulting from modulating signals within the frequency range from 1 c.p.s. to 200 c.p.s. The meter circuit must be sensitive to modulating signals occurring throughout an exceedingly wide range of relative frequencies and extending upwards to as high as 50% of the carrier wave or alternator frequency. The problem thus is of an entirely different order from that encountered in the measurement of conventional high level narrow frequency amplitude modulation, as for instance the amplitude modulation of a very high frequency radio carrier wave by audio or video signals, and requires the utilization of radically different circuits and techniques.

The principal object of the invention is to provide a new and improved amplitude modulation meter or test set and component circuits therefor which will measure relatively low-level amplitude modulations extending over an extremely wide range of frequencies relative to the base or carrier frequency.

Another object is to provide a low-level amplitude demodulator circuit particularly useful for recovering the modulation envelope of a carrier wave where the modulation frequency is a high percentage of the carrier wave frequency.

Another object is to provide a low-drift direct current amplifier for use in combination with the amplitude demodulator of the invention in operating a peak-to-peak vacuum tube volt meter circuit for measuring low-level relatively high-frequency amplitude modulation of an alternating voltage.

Yet another object is to provide a gating circuit particularly useful in combination with the low-level amplitude demodulator of the invention in order to erase signals corresponding to the base or carrier frequency and higher harmonics thereof and retain substantially only the modulation envelope of the carrier wave electric voltage.

In accordance with the invention, the modulation meter or test set comprises a low-level demodulator consisting of a four diode switch combined with a memory capacitor that stores the peak voltage of each alternation of the input voltage until the following alternation occurs. The voltage across the memory capacitor is applied to a low drift D.C. amplifier combined with a low pass filter which attenuates the reset impulses of the four diode switch corresponding to the carrier wave frequency without appreciably attenuating the peak-to-peak amplitude of the demodulated signal voltage. The output of the low-drift amplifier is then read on a peak-to-peak reading vacuum tube volt meter or otherwise measured.

According to another feature of the invention, the voltage across the memory capacitor, instead of being applied immediately to the low-drift D.C. amplifier, may be applied to a gating circuit. This circuit comprises a four diode switch combined with a second memory capacitor which samples the charge across the first memory capacitor during the intervals between the reset impulses of the low-level demodulator. A cathode follower may be used to reduce the loading on the first memory capacitor if desired. The reset impulses corresponding to the fundamental carrier wave or alternator output frequency and higher harmonics thereof are thereby substantially completely eliminated from the demodulated signal voltage appearing across the second memory capacitor. The output of the second memory capacitor may then be applied to the low-drift D.C. amplifier as before.

For additional objects and advantages and for a detailed description of preferred embodiments of the invention, attention is now directed to the following description and accompanying drawings. The features of the invention believed to be novel will be more particularly pointed out in the appended claims.

In the drawings:

Fig. 1 is a block diagram with suitable headings of an amplitude modulation meter or test set embodying the invention.

Fig. 2 is a schematic diagram of the meter circuit of Fig. 1.

Fig. 3 shows wave forms illustrating the operating characteristics of the low-level amplitude demodulator circuit of the invention.

Fig. 4 is a block diagram of an amplitude modulation meter or test set embodying the invention and including a preferred form of gating circuit.

Fig. 5 is a schematic diagram illustrating the low-level amplitude-demodulator and the gating circuit of the amplitude modulation meter of Fig. 4.

Fig. 6 shows wave forms illustrating the operating characteristics of the amplitude demodulator and gating circuit of Fig. 5.

Referring to Fig. 1, the amplitude modulation meter or test set is designed to be energized by the nominal 115-volt, 400 c.p.s. input voltage whose amplitude modulation is to be measured. The input is supplied to a regulated D.C. power supply 1 comprising a full-wave rectifier, a series regulator, a two-stage D.C. amplifier and a voltage reference tube. The output from power supply 1 is used to energize a low-drift D.-C. amplifier 2, and a peak-to-peak vacuum tube volt meter circuit 3 operating a meter 4 which reads percentage modulation directly.

The 115-volt, 400 c.p.s. input is at the same time supplied to a low-level amplitude demodulator 5 comprising a four diode switch and a memory capacitor. The voltage across the memory capacitor is applied to low-drift D.C. amplifier 2 which comprises a difference amplifier, a low-pass filter for removing 400 c.p.s. signals and harmonics, and a series regulator. The output signal from the series regulator is supplied to peak-to-peak VTVM 3 which comprises a voltage doubler and a difference amplifier, the difference amplifier serving to energize meter 4 which records the percentage modulation.

Referring to Fig. 2, the nominal 115-volt, 400 c.p.s. input, which may vary from 105 to 125 volts at some 390 to 410 c.p.s., is supplied to input terminals I—I and energizes the primary of transformer T1 of the regulated D.C. power supply. The secondary of transformer T1 has a grounded center tap and is connected in a conventional full wave rectifier circuit with tube V10. Resistor R1 and capacitor C1 serve to filter the D.C. output of rectifier tube V10.

A pentode tube V1 is connected as a series regulator between filter capacitor C1 and the load circuit and regulates the B+ D.C. output. The regulating signal to the control grid of series regulator V1 is initiated by the comparison bridge composed of resistor R11 and reference tube V3 in one leg and resistors R7, R8 and R9 in the other leg. Due to the constant voltage drop characteristic of reference tube V3, the voltage applied to the control grid of triode tube V2B is held constant relative to ground. Potentiometer R8 is adjustable to set the potential of the cathode of triode V2B at approximately the voltage level of the reference tube when the B+ D.C. voltage is at the desired value, and permits adjustment of the D.C. output of the power supply by varying the constant bias. Tube V2B is the first stage of a two stage D.C. amplifier and its anode is connected in series with load resistor R6 to the B+ line and also directly to the control grid of triode tube V2A forming the second stage.

An incremental rise or positive departure in the B+ voltage causes a negative increment in the signal applied to the control grid of triode tube V2B relative to its cathode. The output signal at the anode of tube V2B is a positive-going signal with higher frequency components bypassed by capacitor C9 and is applied to the grid of triode tube V2A which forms the second stage of the D.C. amplifier. It has its cathode connected to the junction of bleeder resistors R5 and R4 serially connected between the B+ line and ground, and its anode connected in series with load resistor R3 to the B+ line. The output signal at the anode of tube V2A is now a negative-going signal which is supplied through grid current limiting resistor R2 to the control grid of series regulator tube V1. This causes the conductivity of V1 to decrease whereby to decrease the B+ voltage, the resulting change being in a direction to erase the original departure.

The nominal 115-volt, 400 c.p.s. voltage is supplied to the primary of transformer T2 of the low-level amplitude demodulator. The secondary or output winding of transformer T2 is connected, in series with charge capacitor C4, across the four diode switch comprising two parallel branches. In the first branch diodes V4A and V4B are connected in series front-to-back, and in the second branch diodes V5A and V5B are identically connected in series front-to-back. Another transformer T3 whose primary is likewise energized by the 115-volt, 400 c.p.s. supply voltage has its secondary or output winding connected in series with memory capacitor C5 across the junction points j1 and j2 in the two branches of the four diode switch. A bleeder resistor R12 connected across charge capacitor C4 forms therewith a charging network and permits the capacitor to discharge partially during the intervals between 400 cycle alternations.

The operation of the low-level amplitude demodulator may be explained as follows, reference being made to the wave forms of Fig. 3. The 400 cycle A.C. voltages $E_2$ and $E_3$ supplied to the four diode switch are generally sinusoidal wave-forms which may be represented by continuous curve 6 in Fig. 3. The maximum amplitude of the 400 cycle alternations varies at a slower rate and may be represented by the dotted line envelope trace 7. The function of the low-level demodulator is to develop across the memory capacitor a voltage which follows the modulation wave form or envelope trace 7.

Voltage $E_2$ will cause the diodes in both branches of the four diode switch, that is V4A and V4B in one branch and V5A and V5B in the other branch, to conduct when the polarity is as shown and to charge up capacitor C4 with the polarity indicated. In the steady state condition, conduction through the diodes will occur just prior and up to the peaks of the negative alternations, the conduction angle depending upon the extent to which C4 operating as a gate control discharges between successive alternations and also upon whether the modulation envelope is increasing or decreasing. Resistor R12 is selected by relation to capacitor C4 so as to give a time constant allowing discharge of C4 to the point where conduction through the diodes is assured on every alternation of the 400 cycle supply even at the highest levels and frequencies of modulation which it is desired to measure. A typical value for capacitor C4 is .01 microfarad and for resistor R12 4.7 megohms.

Except when signal $E_2$ causes the diodes to conduct, signal $E_3$ cannot pass between points j1 and j2. The reason for this is that no signal can pass through diodes V4A and V5A in series because they are connected back-to-back, and likewise no signal can pass through diodes V4B and V5B in series because they are connected front-to-front. A signal then must pass through diagonally opposite diodes, for instance through V4B and V5A as regards a negative-going signal, or through V4A and V5B as regards a positive-going signal. However, such conduction is prevented by the sum of the charge across C4 and the instantaneous value of $E_2$ except at the times when voltage $E_2$ itself causes conduction. During the intervals of conduction, memory capacitor C5 charges with the polarity indicated to the negative peak potential of $E_3$.

The conduction angle of $E_2$ through the diode switch is such that the diodes normally begin to conduct, in the absence of modulation, before $E_3$ has reached the potential stored in the memory capacitor. This causes the voltage across the memory capacitor, represented by curve 8 in Fig. 3 first to drop (in the negative sense) to the instantaneous value of $E_3$ represented by curve 6, and thereafter to rise at the same rate as $E_3$ to its peak negative value. This results in the generation of a spike or pulse as illustrated at 9 in the waveform developed across the memory capacitor even though the modulation envelope is not changing. When the modulation envelope is decreasing in amplitude, the fall-back of the spike is less pronounced as illustrated at 9a whereas when the modulation envelope is increasing in amplitude, the fall-back is yet more pronounced as illustrated at 9b.

As previously pointed out, the conduction angle of $E_2$ through the diodes is selected so as to permit the necessary discharge and recharge of the memory capacitor throughout the range of maximum modulation amplitudes and frequencies which the meter circuit is designed to cover. Since the memory capacitor is both discharged and recharged at each 400 c.p.s. negative alternation, there is no need for placing a bleeder resistor across it, and the distortion in output wave-form due to the exponential discharge which this would entail is thereby avoided.

The signal developed across memory capacitor C5 is a negative signal whose amplitude follows in general the modulation envelope of the 400 c.p.s. supply. Since, as previously mentioned, the modulation frequency may extend down as low as one cycle per second, it is preferable to use a D.C. amplifier in order to permit the vacuum tube volt meter to read very low modulation levels. The memory capacitor is fixed in bias relative to the B+ supply by connecting its positive side to the junction of voltage dropping resistors R35 and R36. The signal across the capacitor is supplied to the grid of triode tube V6A connected as a cathode follower, the anode being connected directly to the B+ supply and a load resistor R16 being interposed between the cathode and ground. A signal corresponding to that applied to the grid of tube V6A is developed across cathode load resistor R16 and thereby applied to the cathode of triode tube V6B. A corresponding amplified signal tends to develop at the anode of the tube across load resistor R17 connecting it to the B+ line. The anode signal is supplied to the filter network comprising resistor R15, inductance L1, and capacitor C6 connected in series to ground. By reason of this filter network, the 400 c.p.s. carrier or base frequency of the input voltage and higher harmonics thereof which were introduced into the modulation envelope signal by the four diode switch demodulator are substantially attenuated in the output signal developed across capacitor C6.

The output signal across capacitor C6 is applied to the control grid of pentode tube V7. This tube operates as a cathode follower and has its anode and screen grid connected to the B+ line and its cathode connected to ground through series load resistors R18, R19. A portion of the cathode output signal of tube V7, determined by the ratio of resistance R19 to the sum of R18 plus R19, is fed back to the control grid of triode tube V6B and is in the same phase as the signal originally applied to the cathode of tube V6B. Thus tube V7 supplies negative feedback to tube V6B, and the actual output signal of tube V6B is the difference between the signal across R16 and that across R19 multiplied by the gain of V6B. As a result, the amplifier comprising tubes V6A, V6B and V7 is very stable and quite insensitive to changes in tube or component characteristics or drift in the B+ supply voltage. At the same time the signal of very high internal impedance characteristic developed across memory capacitor C5 is translated into a signal of low internal impedance characteristic at the cathode of tube V7 and capable of energizing the vacuum tube volt meter circuit without distortion or attenuation by loading.

The signal developed at the cathode of tube V7 is a negative-going signal corresponding to the modulation envelope superimposed on a D.C. component. This signal may be applied to a recording oscilloscope, or by closing S1 it is applied through capacitor C7 to the anode and cathode of diode tubes V8A and V8B of the meter circuit. The cathode of tube V8A is connected to the junction point of voltage dropping resistors R30 and R31 connected in series between the B+ line and ground. The anode of diode V8B is connected to the same point but in series with capacitor C8. Capacitor C7 serves to block the D.C. component of the applied signal and charges negatively through diode V8A in response to a positive-going modulation component. The negative charge on capacitor C7 resulting from a positive-going modulation component is transferred through diode V8B to capacitor C8 and at the same time a negative-going modulation component is transmitted directly through that diode to capacitor C8. The circuit of diodes V8A and V8B thus operates as a voltage doubler, the voltage developed across C8 being equal to the positive peak to negative peak excursion of the signal voltage. The voltage doubling effect insures that the measured signal corresponds to the entire modulation swing of the carrier, that is, both positive and negative alternations are measured.

Resistors R21 and R22 hung across capacitor C8 operate to discharge the capacitor and serve at the same time as a voltage dropping network. The signal from the junction point of the two resistors is applied to the control grid of triode tube V9A. Tubes V9A and V9B together operate as a difference amplifier. The two tubes are provided with substantially identical cathode load resistors R23 and R28. Adjustable potentiometer R26 permits adjustment to zero potential difference between the cathodes of the two tubes when the percentage modulation and therefore the signal developed across resistor R22 is zero. When amplitude modulation is present, the negative voltage proportional thereto which is developed across resistor R22 unbalances triode V9A relative to triode V9B and the extent of unbalance is indicated by meter 4 connected between the cathodes of the two tubes. Resistor R24 and adjustable potentiometer R25 in series with meter M permit adjustment of the scale deflection of the meter. The meter may be calibrated to read in terms of percentage modulation by applying a definite input voltage level which is used as a base for calibration according to the relationship:

Percent Modulation
$$=\frac{\text{Peak-to-peak voltage level of modulation}}{2\times\text{average peak voltage of input signal}}\times 100$$

Typical values of circuit elements used in modulation meter or test set circuit constructed in accordance with the invention are as follow:

Table I

Resistor values:
| R1 | 500 ohms. |
|---|---|
| R2 | 100 kilohms. |
| R3 | 470 kilohms. |
| R4 | 24 kilohms. |
| R5 | 12 kilohms. |
| R6 | 470 kilohms. |
| R7 | 24 kilohms. |
| R8 | 5 kilohm pot. |
| R9 | 39 kilohms. |
| R11 | 47 kilohms. |
| R12 | 4.7 megohms. |
| R15 | 160 kilohms. |
| R16 | 8.2 kilohms. |
| R17 | 330 kilohms. |
| R18 | 56 kilohms. |
| R19 | 27 kilohms. |
| R21 | 8.2 megohms. |
| R22 | 1.5 megohms. |
| R23 | 2.2 kilohms. |
| R24 | 22 kilohms. |
| R25 | 20 kilohm pot. |
| R26 | 5 kilohm pot. |
| R27 | 56 kilohms. |
| R28 | 2.2 kilohms. |
| R29 | 1.5 megohm. |
| R30 | 68 kilohms. |
| R31 | 30 kilohms. |
| R32 | 68 kilohms. |
| R35 | 12 kilohms. |
| R36 | 100 kilohms. |

Capacitor values:
| C1 | .47 mfd. 600 v.d.c. |
|---|---|
| C2 | .1 mfd. 400 v.d.c. |
| C4 | .01 mfd. 400 v.d.c. |
| C5 | .01 mfd. 300 v.d.c. |
| C6 | .022 mfd. 400 v.d.c. |
| C7 | .47 mfd. 200 v.d.c. |
| C8 | .47 mfd. 200 v.d.c. |

Tubes:
| V1 | 6005/6AQ5-W. |
|---|---|
| V2 | 12AT7WA. |
| V3 | 5651. |
| V4 | 5726/6AL5-W. |
| V5 | 5726/6AL5-W. |
| V6 | 12AT7WA. |
| V7 | 6005/6AQ5-W. |
| V8 | 5726/6AL5-W. |
| V9 | 5814-A. |
| V10 | 6X4W. |

An instrument constructed as described herein with the above typical values of circuit elements and used to measure amplitude modulation of a 115-volt, 400 c.p.s. supply, measures 2% modulation with full scale meter reading and with an accuracy of ±5% of full scale reading. It provides a continuous indication with modulation signals from 1 to 200 cycles per second. Modulations as large as 2% at 100 c.p.s. or 1% at 200 c.p.s. can be measured. Short duration pulses occurring only at relatively long or random periods are indicated by rapid pointer fluctuations of the meter.

According to another feature of the invention, a gating circuit comprising another four diode switch may be used to eliminate the reset impulses of the low-level amplitude demodulator and thereby extend the range of the meter to permit it to measure higher percentages of amplitude modulation or to respond accurately to higher modulation frequencies. Referring to Fig. 4, the meter or test set circuit, which is otherwise the same as that of Figs. 1 and 2, is modified by the introduction of gating circuit 10 between low-level amplitude demodulator 5 and low drift D.C. amplifier. The gating circuit comprises a four diode switch followed by a second memory capacitor.

Referring to Fig. 5, the circuit details of the gating circuit are therein schematically illustrated and the circuit of the low-level amplitude demodulator is repeated for convenience in following the operation of the entire combination. The signal voltage across memory capacitor C5 of the low-level amplitude demodulator, henceforth referred to as as the first memory capacitor for convenience, is transmitted to a second capacitor C11 through a four diode switch preferably preceded by a cathode follower, as illustrated, to reduce the loading on the first memory capacitor. The signal voltage is applied to the control grid of triode tube V11 connected as a cathode follower and a corresponding signal is developed across its cathode load resistor R41. The four diode switch comprises silicon diodes D1 and D2 connected in series front-to-back in one branch, and silicon diodes D3 and D4 connected in series front-to-back in a second parallel branch. A transformer T4 whose primary is energized by the 115-volt, 400 c.p.s. supply has its secondary connected across the two parallel branches of the switch in series with charge or gate control capacitor C10 shunted by resistor R40. The circuit from 1st memory capacitor C5 through cathode follower V11 to second memory capacitor C11 is completed through the four diode switch, the cathode of V11 being connected to junction point j3 of the diodes in one branch, and capacitor C11 to junction point j4 of the diodes in the other branch.

In operation, capacitor C10 charges up with the polarity indicated to approximately the peak value of the alternating voltage $E_4$ generated by the secondary of transformer T4 on the positive half cycle. The diode switch operates in similar manner to that of the low-level demodulator with the result that a signal can only be transferred from capacitor C5 to capacitor C11 during the times when voltage $E_4$ causes the diodes to conduct. Transformer T4 is polarized as indicated so that the conduction interval of the four diode switch of the gating circuit occurs at a different time and is approximately 180° out of phase with that of the low-level demodulator. Accordingly the charge on first memory capacitor C5 is transferred to second memory capacitor C11 in the manner represented by curve 11 in Fig. 6. The general shape of curve 11 is similar to that of curve 8 and therefore represents the same modulation wave form or envelope. However due to the fact that conduction to the second memory capacitor to either increase or decrease its charge occurs about midway between the 400 cycle per second reset impulses which are present in curve 8, the reset impulses are for all practical purposes eliminated from curve 11.

The use of the gating circuit as illustrated in Figs. 4 and 5 allows the conduction angle of the four diode switch in the low-level amplitude demodulator to be increased substantially by comparison with the conduction angle otherwise permissible. This of course permits the first memory capacitor to follow accurately substantially greater percentages of amplitude modulation, for instance up to 5% amplitude modulation at 200 c.p.s., or greater frequencies of amplitude modulation, inasmuch as the rate of change of the modulation envelope and the ability of memory capacitor C5 to follow this rate of change are the limiting factors. Of course when the conduction angle is increased, the reset impulses or spikes 9, 9a and 9b illustrated in Figs. 3 and 6 increase in amplitude. However the operation of the gating circuit substantially eliminates the reset impulses or spikes from the charge developed across the second memory capacitor C11 so that the peak-to-peak vacuum tube volt meter in the end will respond to the modulation envelope signal and not to be thrown off by the 400 c.p.s. component and its harmonics.

The charge across capacitor C11 may be supplied to the low drift D.C. amplifier and by it to the peak-to-peak volt meter in the same manner as has previously been described with reference to Figs. 1 and 2 except that the need for the low pass filter comprising resistor R15, inductance L1, and capacitor C6 is now eliminated.

Typical values of circuit elements used in a modulation meter having the gating circuit modification of Figs. 4 and 5 are as follows where different from those previously given in Table I.

*Table II*

Resistor values:
    R12 _____ 820 kilohms.
    R40 _____ 820 kilohms.
    R41 _____ 100 kilohms.

Tubes:
    V11 _____ 6C4.

Capacitor values:
    C5 _____ .01 mfd. 500 v. mica.
    C10 _____ .01 mfd. 400 v. D.C.
    C11 _____ .01 mfd. 500 v. mica.

Transistors:
    D1, D2, D3, D4 _____ 1N645.

Although preferred embodiments of my invention have been disclosed and described in detail, these are intended as illustrative and not as limitative. It will be understood that the invention is not to be limited to the specific construction and arrangement of parts shown but that these parts may be widely modified within the spirit and scope of the invention as defined by the appended claims.

What I claim as new and desire to secure by Letters Patent of the United States is:

1. An amplitude demodulator circuit for providing a signal corresponding to the modulation envelope of a carrier wave where the modulation percentage is small and the modulation frequency extends over a wide range up to a substantial percentage of the carrier wave frequency comprising a four diode switch comprising two parallel branches each including a pair of serially connected diodes, means for applying said carrier wave across said two branches in series with a gate control charging network, and means for applying said carrier wave across the junction points of the diodes in said two parallel branches in series with a memory capacitor whereby to develop a charge in said memory capacitor which follows the modulation envelope of said carrier wave.

2. An amplitude demodulator circuit for providing a signal corresponding to the modulation envelope of a carrier wave where the modulation percentage is small and the modulation frequency extends over a wide range up to a substantial percentage of the carrier wave frequency, comprising a four diode switch consisting of two parallel branches each including a pair of serially connected diodes, transforming means energized by said carrier wave and including an output winding and a charging network in series therewith connected across said four diode switch, a second transforming means likewise energized by said carrier wave and including an output winding and a memory capacitor in series therewith connected across the junction points of the diodes in said two branches whereby the charge developed across said memory capacitor follows the modulation envelope of said carrier wave.

3. An amplitude demodulator circuit for providing a signal corresponding to the modulation envelope of an alternating voltage supply where the amplitude modulation is but a few percent and the modulation frequency extends from less than 1% up to 50% of the supply frequency, comprising a four diode switch consisting of two parallel branches each including a pair of serially connected diodes, transforming means energized by said alternating voltage supply and including an output winding and a gate control charging network in series therewith connected across said two branches, a second transforming means likewise energized by said alternating voltage supply and including an output winding and a memory capacitor in series therewith connected across the junction points of the diodes in said two branches, whereby the charge developed across said memory capacitor follows the modulation envelope of said alternating voltage supply.

4. An amplitude demodulator circuit for providing a signal corresponding to the modulation envelope of an alternating voltage supply where the amplitude modulation is but a few percent and the modulation frequency extends from less than 1% up to 50% of the supply frequency, comprising a four diode switch consisting of two parallel branches each including a pair of diodes serially connected front to back at a junction point in each branch, transforming means energized by said alternating voltage supply and including an output winding and a charging network in series therewith connected across said two branches, a second transforming means likewise energized by said alternating voltage supply and including an output winding and a memory capacitor in series therewith connected across the junction points of the diodes in said two branches, whereby the charge developed across said memory capacitor follows the modulation envelope of said alternating voltage supply.

5. A meter for measuring the amplitude modulation of a carrier wave where the modulation percentage is small and the modulation frequency extends over a wide range up to a substantial percentage of the carrier wave frequency, comprising a low level demodulator circuit including a four diode switch consisting of two parallel branches each including a pair of serially connected diodes, transforming means energized by said carrier wave and including an output winding and a charging network in series therewith connected across said two branches, a second transforming means likewise energized by said carrier wave and including an output winding and a memory capacitor in series therewith connected across the junction points of the diodes in said two branches whereby the charge developed across said memory capacitor includes a unidirectional component and an alternating component corresponding to the modulation envelope of said carrier wave, a low drift D.C. amplifier including a difference amplifier and a series regulator with high negative feed-back to said difference amplifier for translating said charge into a corresponding output signal of low internal impedance characteristic, and means for measuring said output signal.

6. A meter for measuring the amplitude modulation of a carrier wave where the modulation percentage is small and the modulation frequency extends over a wide range up to a substantial percentage of the carrier wave frequency, comprising a low level demodulator circuit including a four diode switch consisting of two parallel branches each including a pair of serially connected diodes, transforming means and a gate control charging network in series therewith connected across said two branches, a second transforming means and a memory capacitor in series therewith connected across the junction points of the diodes in said two branches, connections for energizing said transforming means with a carrier wave whose amplitude modulation is to be measured whereby the charge developed across said memory capacitor includes a unidirectional component and an alternating component corresponding to the modulation envelope of said carrier wave, a low drift D.C. amplifier including a difference amplifier and a series regulator with high negative feed-back to said difference amplifier for translating said charge into a corresponding output signal of low internal impedance characteristic, and a peak-to-peak vacuum tube voltmeter circuit including a voltage doubler circuit for eliminating the unidirectional component and responding to the peak-to-peak excursions of the alternating component in said output signal, and a difference amplifier including a meter responding to the output of said voltage doubler circuit.

7. The combination, in an amplitude modulation measuring circuit for providing a signal corresponding to the modulation envelope of a carrier wave, of a low level demodulator including a first four diode switch consisting of two branches each containing a pair of serially connected diodes and an output circuit including a first memory capacitor connected across the junction points of the diodes in said two branches and providing across said first memory capacitor a signal following the modulation envelope of said carrier wave and including reset impulses corresponding to conduction through said first switch, and a gating circuit comprising a second four diode switch conducting at different times than said first switch and connecting said first memory capacitor to a second memory capacitor to develop across said second memory capacitor a corresponding signal from which the reset impulses are substantially eliminated.

8. The combination, in an amplitude modulation measuring circuit for providing a signal corresponding to the modulation envelope of a carrier wave, of a low level demodulator including a first four diode switch consisting of two parallel branches each containing a pair of serially connected diodes, a first transforming means and a charging network in series therewith connected across said first four diode switch, a second transforming means and a first memory capacitor in series therewith connected across the junction points of the diodes in said two branches, and a gating circuit including a second four diode switch consisting of two parallel branches each containing a pair of serially connected diodes, a third transforming means connected across said second four diode switch, a circuit including said first memory capacitor and a second memory capacitor connected in series across the junction points of the diodes in the two branches of said second switch, and connections for energizing said transforming means with a carrier wave whose amplitude modulation is to be measured and achieving conduction at different times in said switches.

9. The combination, in an amplitude modulation measuring circuit for providing a signal corresponding to the modulation envelope of a carrier wave, of a low level demodulator including a first four diode switch consisting of parallel branches each containing a pair of serially connected diodes, a first transforming means and a charging network in series therewith connected across said first four diode switch, a second transforming means and a first memory capacitor in series therewith connected across the junction points of the diodes in said two branches, and a gating circuit including a second four diode switch consisting of two parallel branches each containing a pair of serially connected diodes, a third transforming means connected across said second four diode switch, a circuit receiving the output of said first memory capacitor and comprising a second memory capacitor connected in series across the junction points of the diodes in the two branches of said second switch, and connections for energizing said transforming means with a carrier wave whose amplitude modulation is to be measured and achieving conduction in said switches in opposite phase relative to said carrier wave, whereby the first memory capacitor provides a signal following the modulation envelope of said carrier wave and including reset impulses corresponding to conduction through said first switch, and the second memory capacitor provides a similar signal from which the reset impulses are substantially eliminated.

10. The combination of claim 9 including a cathode follower in the circuit receiving the output of said first memory capacitor for reducing the loading thereon in charging said second memory capacitor.

11. In combination with a low level demodulator providing at output terminals a signal corresponding to the modulation envelope of an amplitude modulated alternating voltage supply but including undesired reset impulses occurring at the supply frequency, a gating circuit for eliminating said reset impulses comprising a four diode switch consisting of two parallel branches each including a pair of diodes serially connected front-to-back, means connected across said two branches causing conduction through the diodes at times intermediate the occurrences of said reset impulses, and a memory capacitor connected in series with said output terminals across the junction points of the diodes in said two branches whereby to develop across said memory capacitor a corrected signal from which said reset impulses are substantially eliminated.

12. In combination with a low level demodulator providing at output terminals a signal corresponding to the modulation envelope of an amplitude modulated alternating voltage supply but including undesired reset impulses occurring at the supply frequency, a gating circuit for eliminating said reset impulses comprising a four diode switch consisting of two parallel branches each including a pair of diodes serially connected front-to-back, transforming means energized by said alternating voltage supply and including an output winding and including a charging network in series therewith connected across said two branches and applying said alternating voltage thereto, said output winding being polarized to cause conduction through said diodes at times intermediate the occurrences of said reset impulses, and a memory capacitor connected in series circuit with said output terminals across the junction points of the diodes in said two branches whereby to develop across said memory capacitor a corrected signal from which said reset impulses are substantially eliminated.

References Cited in the file of this patent

UNITED STATES PATENTS

| | | |
|---|---|---|
| 1,967,306 | Hallen | July 24, 1934 |
| 2,250,284 | Wendt | July 22, 1941 |
| 2,521,482 | Ruston | Sept. 5, 1950 |
| 2,741,668 | Iffland | Apr. 10, 1956 |